J. J. SMITH.
WEED CUTTER.
APPLICATION FILED AUG. 25, 1908.
924,392.
Patented June 8, 1909.
2 SHEETS—SHEET 2.
Fig. 4.
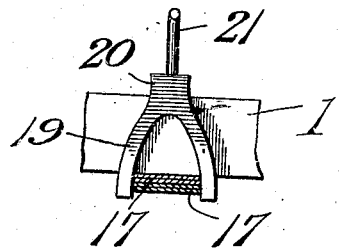
Fig. 6.
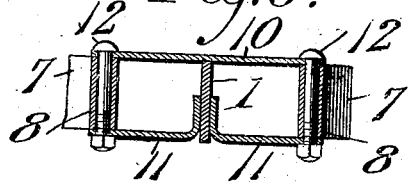
Fig. 11.
Fig. 9.
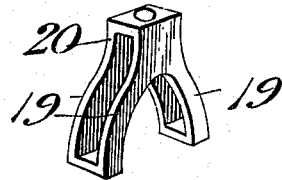
Fig. 8.
Fig. 10
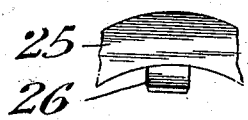
Witnesses
Phil O. Barnes
J. L. Wright
Inventor
Joseph J. Smith
By Victor J. Evans
Attorney

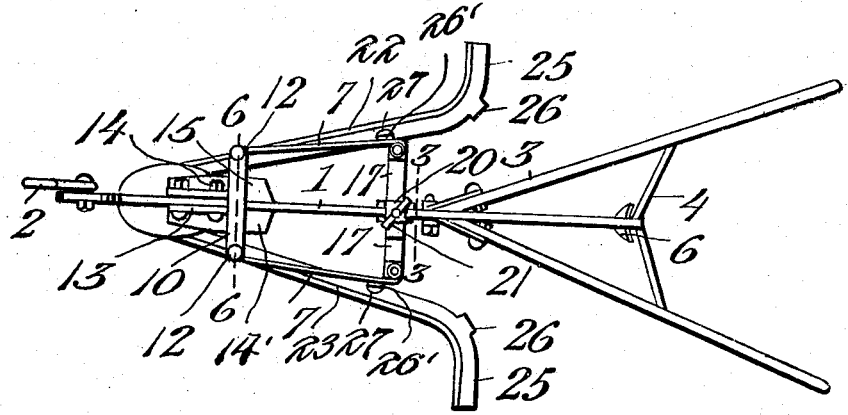
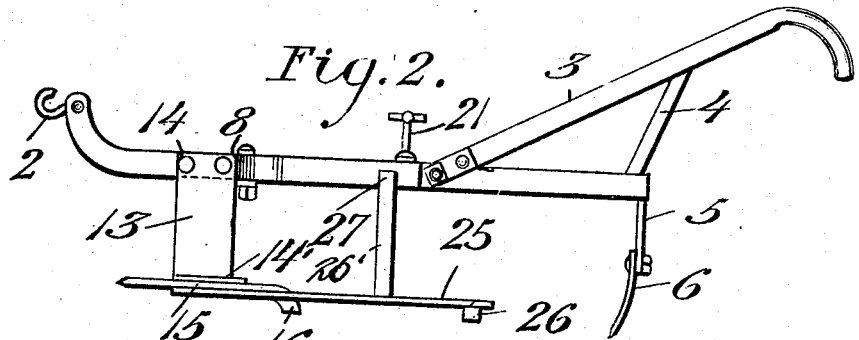
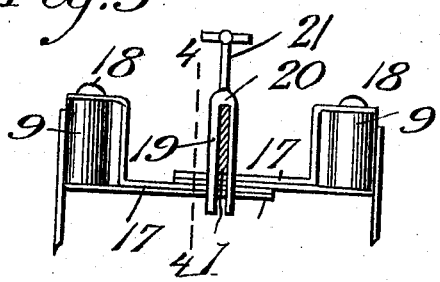
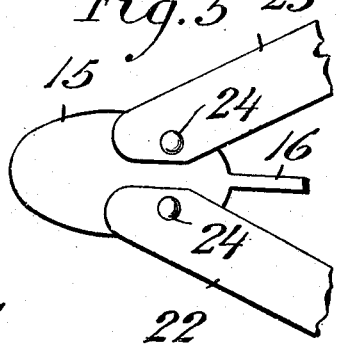
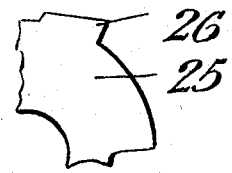

UNITED STATES PATENT OFFICE.

JOSEPH J. SMITH, OF WOODBURN, OREGON.

WEED-CUTTER.

No. 924,392.     Specification of Letters Patent.     Patented June 8, 1909.

Application filed August 25, 1908. Serial No. 450,207.

*To all whom it may concern:*

Be it known that I, JOSEPH J. SMITH, a citizen of the United States, residing at Woodburn, in the county of Marion and State of Oregon, have invented new and useful Improvements in Weed-Cutters, of which the following is a specification.

This invention relates to improvements in weed cutters and cultivators, and has for its principal object the production of an implement of this character wherein the cutter blades are rendered adjustable in a simple and effective manner to vary their range of cutting action, and wherein an improved construction and arrangement of elements is provided to increase the practical efficiency of this class of agricultural implements.

The invention consists of the features of construction and combination of parts hereinafter fully described and claimed, reference being had to the accompanying drawings, in which:

Figure 1 is a top plan view of a weed cutter and cultivator constructed in accordance with my invention. Fig. 2 is a side elevation of the same. Fig. 3 is a cross section on the line 3—3 of Fig. 1. Fig. 4 is a section on the line 4—4 of Fig. 3. Fig. 5 is a top plan view of the forward cutter blade and the forward ends of the divergent cutter blades pivoted thereto. Fig. 6 is a cross section through the forward part of the cutter supporting frame on the line 6—6 of Fig. 1. Fig. 7 is a fragmentary top plan view of the rear end of one of the divergent cutting blades. Fig. 8 is an inverted perspective view thereof. Fig. 9 is a detail perspective view of the clamping yoke. Fig. 10 is a cross section through one of the divergent blades. Fig. 11 is a detail section, showing the upper end of the slotted hanger and the main beam mounted therein.

Referring now more particularly to the drawings, the numeral 1 designates a main beam provided at its forward end with a suitable draft attachment 2 and having suitably secured thereto the forward ends of stilts or handles 3 reinforced therefrom by braces 4. From the rear end of the beam depends a standard 5 carrying a cultivator shovel 6. The main beam 1 also supports the weed cutting devices and the supporting frame or attachments thereof, the latter comprising a pair of side beams 7 disposed on opposite sides of said main beam and having their front and rear ends coiled to form sleeves 8 and 9.

Extending over the front portion of the beam 1 is a cross bar or plate 10, below which are arranged bracing plates 11 suitably fastened at their inner ends to the main beam and extending laterally therefrom in alinement with the plate 10. Bolts 12 extend downward through the ends of the plate 10 and bracing plates 11 and through the sleeves 8 of the side beams 7 and rigidly connect said plates together and to the main beam and pivotally attach the forward ends of the side beams so as to adapt the rear ends of said beams to swing laterally relative to the main beam 1.

Depending from the beam 1 immediately in advance of the plates 10 and 11 is a hanger 13 slotted at its upper end to receive the beam 1 and fastened thereto by bolts 14, the lower end of said hanger being provided with a horizontal attaching piece or plate 14' bolted to a forward cutter plate 15, which is rigidly fastened to the main beam by the said hanger. The cutter plate 15 may be of any desired form and operates in the line of draft of the machine to cut out the weeds and roots, its forward edge being beveled or otherwise suitably shaped to form a cutting point or surface. At its rear the plate 15 is formed with an angular or downwardly bent projection 16 serving the function of a runner to hold the blade from lateral deflection under strain and to cut a furrow in the earth and loosen up the weeds and roots.

The rear ends of the side beams 7 are pivotally connected to spreading and attaching pieces or plates 17, each consisting of a single piece of sheet metal folded centrally upon itself with the ends of its arms directed outward and the end of the upper arm upwardly extended and laterally bent to form in conjunction with the underlying end of the lower arm a fork to embrace or engage the upper and lower portions of the sleeve 9 of the adjacent side beams, the said sleeve ends of the side beams being pivotally secured thereto by bolts 18 passing through the ends of the arms of the attaching plates 17 and through the sleeves 9. The inner ends of the attaching plates 17 overlap beneath the main beam 1 and are fastened thereto by a double clamping yoke or saddle 19, the head or upper crossed portion 20 of which is formed with a threaded opening for the reception of a clamping screw 21, which is adapted to impinge against the upper edge of the main beam and, through the action of the yoke, draw the lapping ends of the attaching plates 17 in engagement therewith. This construction provides a longitudinally adjustable transverse attaching bar formed by the two members 17 whereby the rear ends of the side beams 7 may be adjusted toward and from the main beam and clamped securely in adjusted position.

Coöperating with the cutter 15 are cutting blades 22 and 23 which are pivotally attached at their forward ends to the blade 15 by bolts or rivets 24 and extend rearwardly therefrom in divergent relation and are provided with outwardly or laterally bent free ends 25 provided with downturned projections 26 at their angle of intersection with the main portions of the blade, and which serve the same function as the downwardly bent projection 16 of the forward cutter 15. The outer edges of these divergent blades 22 and 23 are beveled or otherwise suitably formed to provide cutting edges, and as the implement moves forward over the surface of the ground said blades 22 and 23 lie flat upon and travel over said surfaces, their cutting edges acting to sever the weeds close to the ground surface. The divergent blades are provided with upwardly extending arms 26' which are fastened to the side beams 7 by a bolt or rivet 27, and, as the forward end of the blades 22 and 23 are pivotally connected to the cutter 15, it will be seen that when the beams 7 are adjusted toward and from the main beam 1 the divergent blades will be correspondingly adjusted therewith to project to a greater or less extent beyond the main beam to vary their range of cutting action.

It will be seen that the cutter 15 forms the point or vertex portion of a V-shaped cutter whose arms are formed by the divergent blades and that said blade 15 will always cut in the center line of the implement while the size of the cutter as a whole may be increased or diminished through the adjustability of the divergent blades; also that the construction is such as to enable the divergent blades to be readily and conveniently adjusted and firmly secured in adjusted positions.

I have shown in the present instance a single cultivator shovel applied at the rear of the main beam, but it will, of course, be understood that any number of shovels may be used and arranged in any desired relation to cultivate the soil at the same time that the cutters are acting to remove the weeds from the field.

Having thus described my invention, what I claim is:

1. In an agricultural implement of the character described, the combination of a main beam, a hanger depending therefrom, a forward cutter carried by the hanger, divergent cutting blades pivoted at their front ends to the forward cutter, upper and lower cross pieces fixed to the main beam, side beams having their front and rear ends formed with coils, the front coils being arranged between said upper and lower cross pieces, bolts passing through and pivotally connecting said front coils to said cross pieces, attaching members having lapping inner ends and forked outer ends, the latter receiving the rear coiled ends of the side beams, bolts passing through said rear coiled ends of the side beams and pivotally connecting the same with said forked ends, means for adjustably connecting and securing the lapping ends of the attaching members to the main beam, and connections between said divergent cutters and said side beams.

2. In an agricultural implement of the character described, the combination of a main beam, a forward cutter supported therefrom, divergent cutters pivotally connected at their forward ends to the forward cutter, the said forward cutter and divergent cutters being provided at their rear ends with downwardly extending earth-penetrating projections, and means for adjustably connecting the divergent cutters with the main beam.

In testimony whereof I affix my signature in presence of two witnesses.

JOSEPH J. SMITH.

Witnesses:
 Roy C. Kelsey,
 Chas. L. Ogle.